(12) United States Patent
Bhagat

(10) Patent No.: US 6,422,233 B1
(45) Date of Patent: Jul. 23, 2002

(54) COOKING UTENSIL WITH A BASE CONSTITUTED OF A COMPOSITE STRUCTURE

(75) Inventor: Amaury Bhagat, Paris (FR)

(73) Assignee: Ekono Sarl (FR)

( * ) Notice: Subject to any disclaimer, the term of this patent is extended or adjusted under 35 U.S.C. 154(b) by 0 days.

(21) Appl. No.: 09/739,439

(22) Filed: Dec. 18, 2000

(51) Int. Cl.$^7$ .................................................. A47J 27/00

(52) U.S. Cl. ............................ 126/390.1; 126/375.1; 220/626; 220/912; 99/422

(58) Field of Search ........................... 126/390.1, 375.1; 220/626, 912; 99/422; 219/621

(56) References Cited

U.S. PATENT DOCUMENTS

| | | | | |
|---|---|---|---|---|
| 2,040,102 A | * | 5/1936 | Peron | 126/390.1 |
| 2,526,687 A | * | 10/1950 | Reams | 126/390.1 |
| 5,564,590 A | * | 10/1996 | Kim | 126/290.1 |
| 5,647,271 A | * | 7/1997 | Capelle | 126/390.1 |

* cited by examiner

Primary Examiner—James C. Yeung
(74) Attorney, Agent, or Firm—Schnader Harrison Segal & Lewis LLP

(57) ABSTRACT

This invention concerns a cooking utensil having a base constituted by a composite structure including an insert plate in aluminum and an external plate in stainless steel with perforations allowing the insert plate in aluminum to be flush with it, characterized in that the central zone of the base is stamped to form a sunken disc zone without perforations, and in that the density of perforations has a maximum value in an intermediary annular band, the density of perforations being greater than 20%.

14 Claims, 4 Drawing Sheets

COOKING UTENSIL WITH A BASE CONSTITUTED OF A COMPOSITE STRUCTURE

FIELD OF THE INVENTION

This invention relates to cooking utensils, particularly to utensils that allow efficient heating with either a gas-cooker burner or an induction heating plate.

BACKGROUND

Cooking utensils manufactured with a base having a composite structure are known. The composite structure comprises a layer of aluminum and a layer of stainless steel stamped and set on the base of the recipient.

It is known in the art to make perforations in a stainless steel plate to allow the aluminum, which is a good thermal conductor, to be flush with the surface of the stainless steel, whose electromagnetic properties favor induction heating. Since aluminum has mechanical properties lower than those of steel, the cumulated perforation surface is generally limited to about 15%. An augmentation in the size and/or number of perforations, according to those skilled in the art, would have the effect of weakening the base. In the same way, perforations may result in reptures of the external skin in the stainless steel and, particularly, when the perforations are of an elongated shape and oriented radially.

Thus, it would be advantageous to improve the performance of such utensils which can be used equally well on a gas-cooker and an induction plate, by providing a base with improved thermal conductivity as well as mechanical resistance. More precisely, it would be highly advantageous to provide a utensil with very high thermal conductivity, for optimum use on a gas-cooker which concerns the majority of users, and whose thermal and mechanical specifications are nonetheless very satisfactory for use on induction plates or halogen plates.

SUMMARY OF THE INVENTION

The invention relates to a cooking utensil including a composite base structure including an aluminum insert plate and an external stainless steel plate, the external plate having perforations therethrough, the perforations filled by portions of the insert plate which are flush with an outer surface of the external plate, the external plate having a central zone stamped to form a sunken disc zone without perforations, and wherein the density of the perforations has a maximum value in an intermediary annular band located on the outer surface, the density of the perforations being higher than about 20% and the surface area of a largest perforation therein being less than about 0.8% of the external plate.

BRIEF DESCRIPTION OF THE INVENTION

The invention will be understood better by reading the following description, referring to the attached drawings concerning non-limiting examples of embodiments in which.

DETAILED DESCRIPTION

Figure 1:
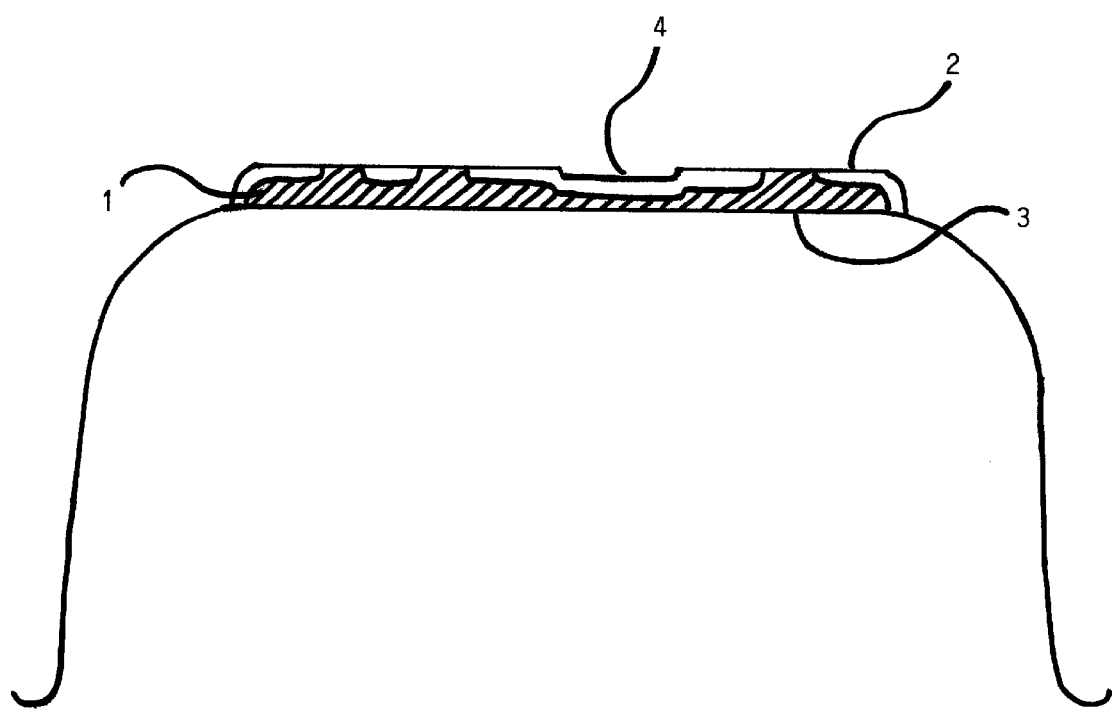
FIG. 1 represents a transversal cross-section of a cooking utensil according to the invention.
Figure 2:
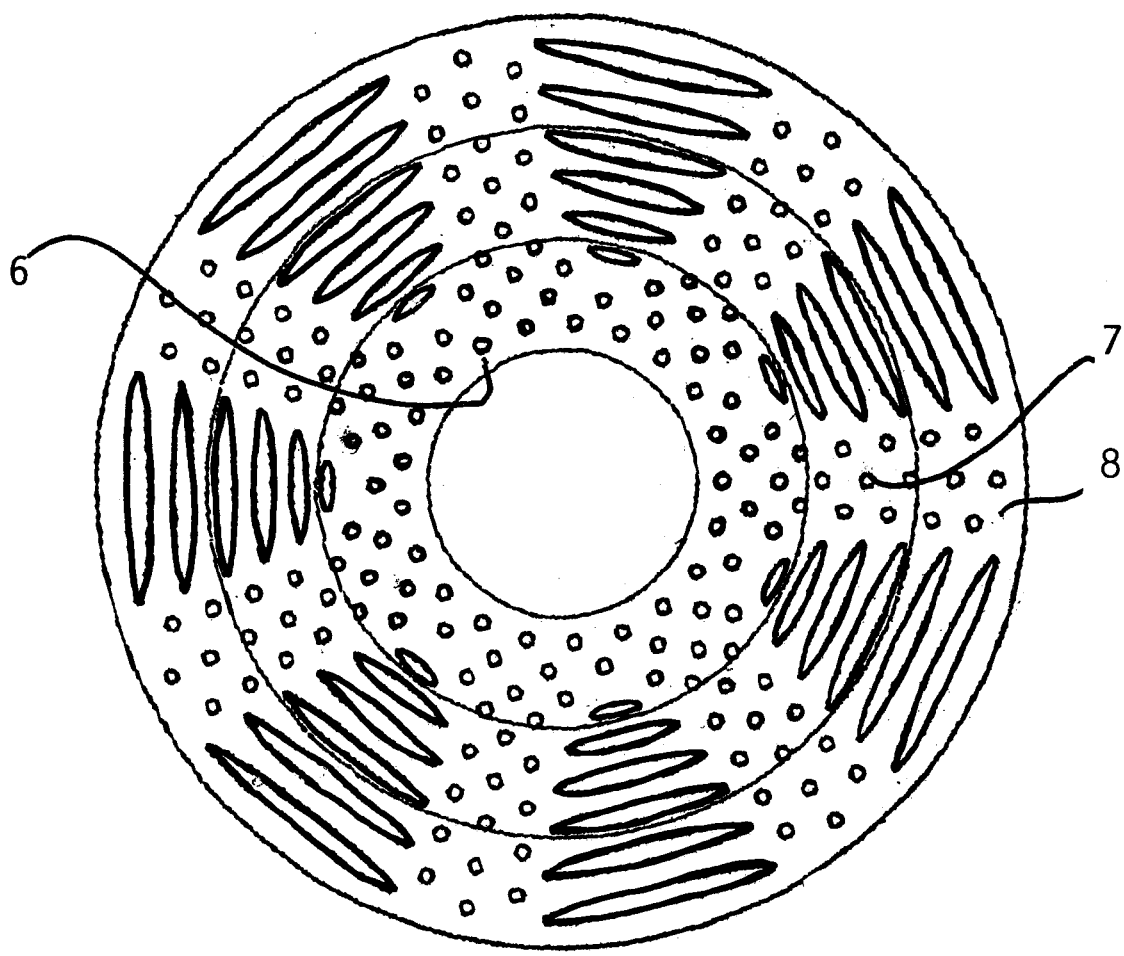
FIG. 2 represents a view of such a utensil from below.
Figure 3:
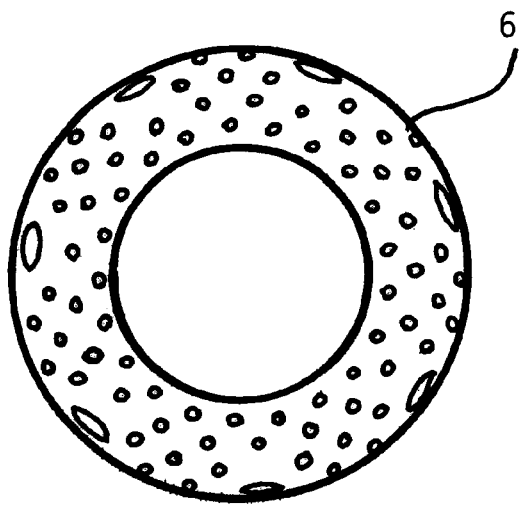
FIGS. 3 to 5 represent views of three successive annular zones.
Figure 4:
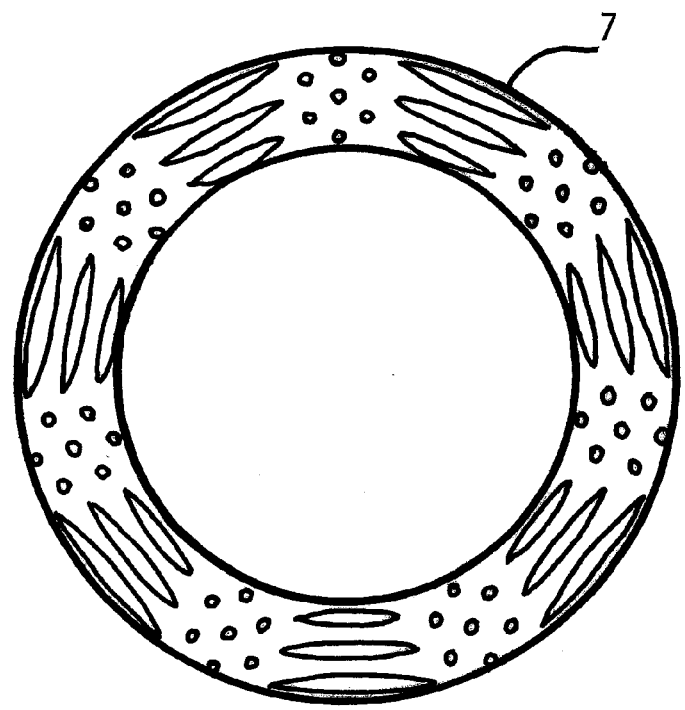
Figure 5:
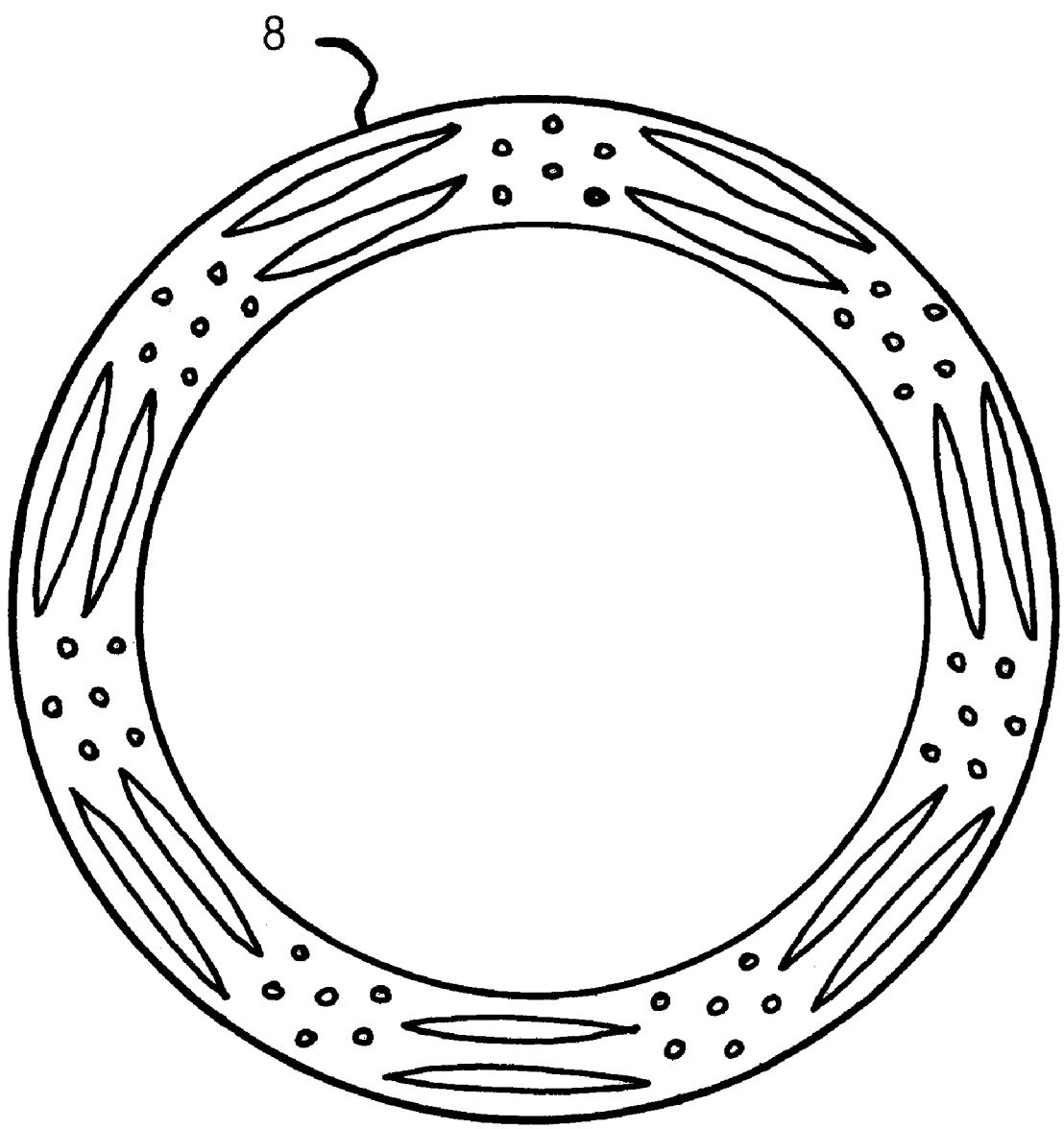

The following description is intended to refer to specific embodiments of the invention illustrated in the drawings and is not intended to define or limit the invention, other than in the appended claims. Also, the drawings are not to scale and various dimensions and proportions are contemplated.

The invention concerns, in its most general form, a cooking utensil with a base constituted of a composite structure comprising an aluminum insert sheet and a stainless steel external plate with perforations allowing the aluminum insert plate to be flush with it. A central zone of the base is stamped to form a sunken disc zone without perforations, and the density of perforations has a maximum value in an intermediary annular band, the density of perforations being greater than about 20% and the surface area of the biggest perforation being lower than about 0.8% of the surface of the base.

The creation of a central disc zone by stamping makes it possible to avoid blistering of the base resulting from air remaining trapped between two plates during rolling of the base. Moreover, the sunken central zone prevents a "cone" effect, which takes place when the base is deformed.

As sometimes used hereinafter, "density of perforations" means the relation between the cumulated surface of the perforations formed in a reference zone and the total surface of this reference zone. The perforation density would be zero if the reference zone had no perforations, and would be 100% if the reference zone comprised an integral perforation.

In the absence of any other description, the reference zone corresponds to the total surface of the base of the utensil, and the density of perforations then corresponds to the relationship between the total of the perforations in the surface and the total base surface.

"Aluminum" is to be understood as pure aluminum or an aluminum alloy typically used to manufacture cooking utensils because of its thermal properties.

Preferably, the perforations are elliptic or round in shape. The long axis of each of the elliptic perforations is closely oriented perpendicular to the radial axis passing through the center of the perforation.

According to a preferred embodiment, the density of perforations is between about 5 and about 15% in an annular band surrounding the stamped disc zone, a density between about 20 and about 30% in an median annular band and a density between about 15 and about 25% in an exterior annular band.

Preferably, the density of perforations in an annular band surrounding the stamped disc zone is about 10%, the density of perforations in the median annular band is about 25% and the density of perforations in the exterior annular band is about 20%.

According to a particular embodiment, the thickness of the aluminum insert plate is about 5 mm and the thickness of the external plate in stainless steel is about 0.5 mm.

Advantageously, at least 90% of the perforations of the annular zone surrounding the stamped disc zone are round.

According to a preferred variant, the median and exterior annular zones have alternating angular sectors in which elliptic perforations are formed, and angular sections in which round perforations are formed.

According to a particular embodiment, the long axis dimension of the elliptic perforations increases with the distance from the center of the base.

Preferably, the annular zone surrounding the stamped disc zone has an external diameter between about 0.4 and about 0.5 times the diameter of the base.

According to a preferred embodiment, the median annular zone has an external diameter [comprised] between about 0.7 and about 0.8 times the diameter of the base.

Preferably, the annular zone surrounding the stamped disc zone has an external diameter comprised between about 0.4 and about 0.5 times the diameter of the base.

According to a preferred embodiment, the median annular zone has an external diameter comprised between about 0.7 and about 0.8 times the diameter of the base.

According to a preferred embodiment, the surface of the base does not have, outside the stamped zone, any circular non-perforated surface element of diameter greater than about 15 mm.

Turning now to the drawings, FIG. 1 represents a cross-section of an example of a utensil according to an example of an embodiment of the invention.

The utensil has a laminated multi-layer base comprising an aluminum plate 1 and a stainless steel plate 2 set on the lower front surface 3 of the utensil by a hot press applying a pressure of 2,000 tons. The base is 200 mm across in the example described.

The aluminum plate 1 has a thickness of 5 mm. The steel plate 2 has a thickness of 0.5 mm. It has a stamped sunken central disc zone 4 forming a depression of about 1 mm, and a cross-section of 50 mm. This depression is formed by pressing, making the aluminum creep towards the peripheral zones. This central zone 4 is without perforations.

This central zone 4 is surrounded by a perforated zone comprising exclusively round perforations and elliptic perforations. Although the density and the density gradient are critical, the special shape and arrangement of the perforations can give rise to numerous variations guided essentially by aesthetic considerations.

The first annular zone 6 surrounding the central zone 4 has mainly round perforations, each with a diameter of 2.6 mm, as well as elliptic perforations whose small axis measures about 2.3 mm and whose long axis measures about 10 mm. This first annular zone comprises 77 round perforations and 7 elliptic perforations. Its external cross-section is 84 mm. The density of flush aluminum is about 10.77% in this first zone.

The median annular zone 7 has a perforation density of about 24.77%. It comprises three concentric circular rows each comprising 7 elliptic perforations of increasing size. Between two angular sectors of 3 elliptic perforations aligned radially, this median zone has an ensemble of 7 round perforations of 2.6 mm cross-section. This median zone thus comprises 21 elliptic perforations and 49 round perforations. The elliptic perforations have small axes measuring respectively 3.2 mm, 3.7 mm and 3.8 mm, while the long axes measure, respectively, 23 mm, 30 mm and 36 mm.

The third annular zone 8 also has two concentric circular rows each comprising 7 elliptic perforations of increasing size. Between two angular sectors the base has 3 elliptic perforations aligned radially. The small axes of these elliptic perforations measure, respectively, 4 nm, 4.2 mm and 4.2 mm while the long axes measure, respectively, 42 mm, 47 mm and 50 mm. The density of perforations in this peripheral zone 8 is about 21%.

The term "elliptic" is used to describe an oblong surface area approaching that of an ellipse such as defined geometrically. However, an oblong perforation whose shape does not correspond strictly to the geometric definition of the constant sum of the distances from any point to two fixed points will also be considered as elliptic in the terms of the invention.

The base according to the invention is adapted in particular to heating by different types of cookers: gas cookers, producing a flame whose peak corresponds closely to the median annular zone, when the flame is correctly adjusted; induction plates which excite the magnetic stainless steel plate; and ceramic hot-plates, transmitting the heat by convection mainly through the flush aluminum zones.

The invention is described above as a non-limiting example. It allows many variations of aesthetic order.

The arrangement of the perforations is homogeneous. In particular, no zone of more than 10 or 15 mm cross-section is without perforation. It is nonetheless essential to respect the relative specifications of the density of perforations, and above all a density higher than 20% in order to guarantee efficient transmission of the heat when used with a gas-cooker, and preferably a maximum density of the order of 25% in the median annular zone. It is also necessary to envisage a stamped central disc zone to avoid the cone effect, and to expel the air contained between the discs in aluminum and stainless steel during the action of the hot press.

What is claimed is:

1. A cooking utensil comprising a composite base structure, the composite base structure comprising:

an aluminum insert plate, and an external stainless steel plate, said external plate positioned adjacent the insert plate and 1) having perforations therethrough, wherein said perforations are filled by portions of the insert plate extending toward the external plate, the portions being substantially flush with an outer surface of the external plate, 2) having a central zone stamped therein to form a sunken disc zone without perforations, and wherein the density of the perforations has a maximum value in an intermediate annular band located between an outer annular band and an inner annular band of the outer surface of the external plate, the density of the perforations being higher than about 20% and the surface area of a largest perforation being less than about 0.8% of the external plate.

2. The cooking utensil according to claim 1, wherein the perforations are 1) elliptic in shape with a long axis perpendicular to the radial axis, or 2) substantially round.

3. The cooking utensil according to claim 1, wherein the inner annular band, intermediate annular band and the outer annular band are concentrically located on the outer surface and wherein the density of perforations is between about 5 and about 15% in the inner annular band surrounding the stamped disc zone, between about 20 and about 30% in the intermediate annular band and between about 15 and about 25% in the outer annular band.

4. The cooking utensil according to claim 1, wherein the inner annular band, the intermediate annular band and the outer annular band are concentrically located on the outer surface and wherein the density of perforations in the inner annular band surrounding the stamped disc zone is about 10%, in the median annular band is about 25% and in the exterior annular band is about 20%.

5. The cooking utensil according to claim 1, wherein the thickness of the insert plate is about 5 mm.

6. The cooking utensil according to claim 1, wherein the thickness of the external plate is about 0.5 mm.

7. The cooking utensil according to claim 1, wherein at least about 90% of the perforations in the inner annular zone are round.

8. The cooking utensil according to claim 1, wherein the intermediate and outer annular bands have alternate angular sectors in which elliptic perforations are formed, and angular sectors in which round perforations are formed.

9. The cooking utensil according to claim 1, wherein the dimension of a long axis of the perforations increases with the distance from a center of the base.

10. The cooking utensil according to claim 1, wherein the diameter of the perforations is less than about 0.015 times the diameter of the diameter of the base.

11. The cooking utensil according to claim 1, wherein the diameter of the stamped disc zone is substantially equal to about a quarter of the diameter of the base.

12. The cooking utensil according to claim 1, wherein the intermediate annular zone has an outside diameter between about 0.4 and about 0.5 times the diameter of the base.

13. The cooking utensil according to claim 1, wherein the intermediate annular zone has an outside diameter between about 0.7 and about 0.8 times the diameter of the base.

14. The cooking utensil according to claim 1, wherein the outer surface does not have any circular non-perforated surface element of diameter greater than about 10 mm outside the stamped zone.

* * * * *